Patented Feb. 25, 1941

2,232,709

UNITED STATES PATENT OFFICE 2,232,709

PROCESS AND APPARATUS FOR CLEANING OIL

Arnold C. Luetgert, San Francisco, Calif., assignor of one-fifth to Donald M. Carter, Chicago, Ill., and four-fifths to Valerie Luetgert, Cleveland, Ohio, as trustee Application August 10, 1936, Serial No. 95,146

4 Claims. (Cl. 210—51)

This invention relates to a process and apparatus for cleaning oil and is particularly adapted for use in connection with crude oil. This oil contains water, salt and other solid matter and one of the objects of the present invention is to provide a process and apparatus for removing this water, salt and other solid matter. The invention has as a further object to provide a process and apparatus by means of which the water, salt and other solid material may be removed from the oil in a continuous process, that is while the oil is moving continuously.

The invention has as a further object to provide a process and apparatus by means of which the oil in comparatively thin sheets or layers is moved and is alternately decelerated and accelerated during this movement, the movement being preferably entirely by gravity and the head of the oil. The invention has other objects which will be more particularly pointed out in the accompanying description.

Referring now to the drawings.

Like numerals refer to like parts throughout the several figures.

Figure 1:
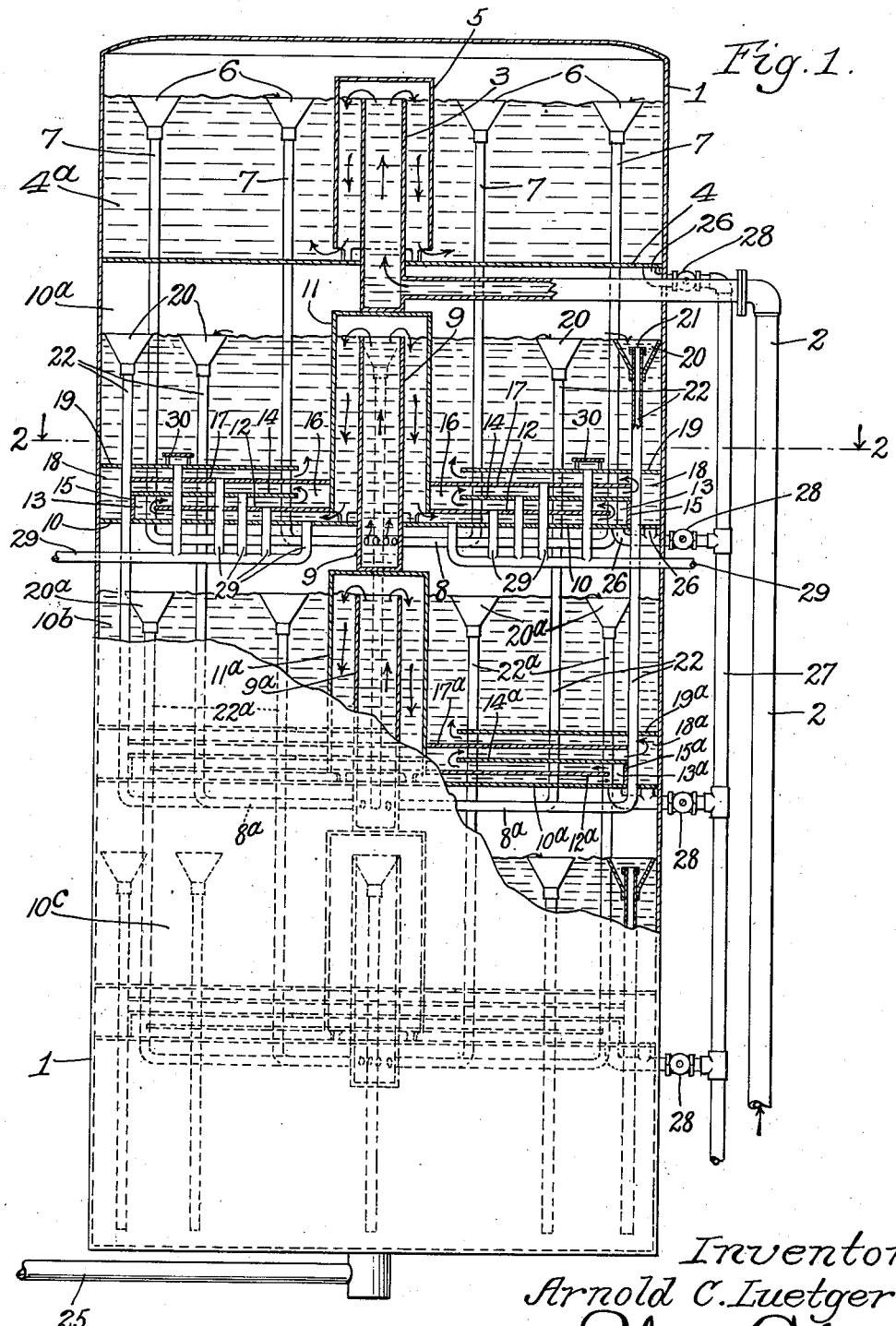
Fig. 1 is a side elevation of one form of apparatus embodying the invention, with parts broken away and in section.
Figure 2:
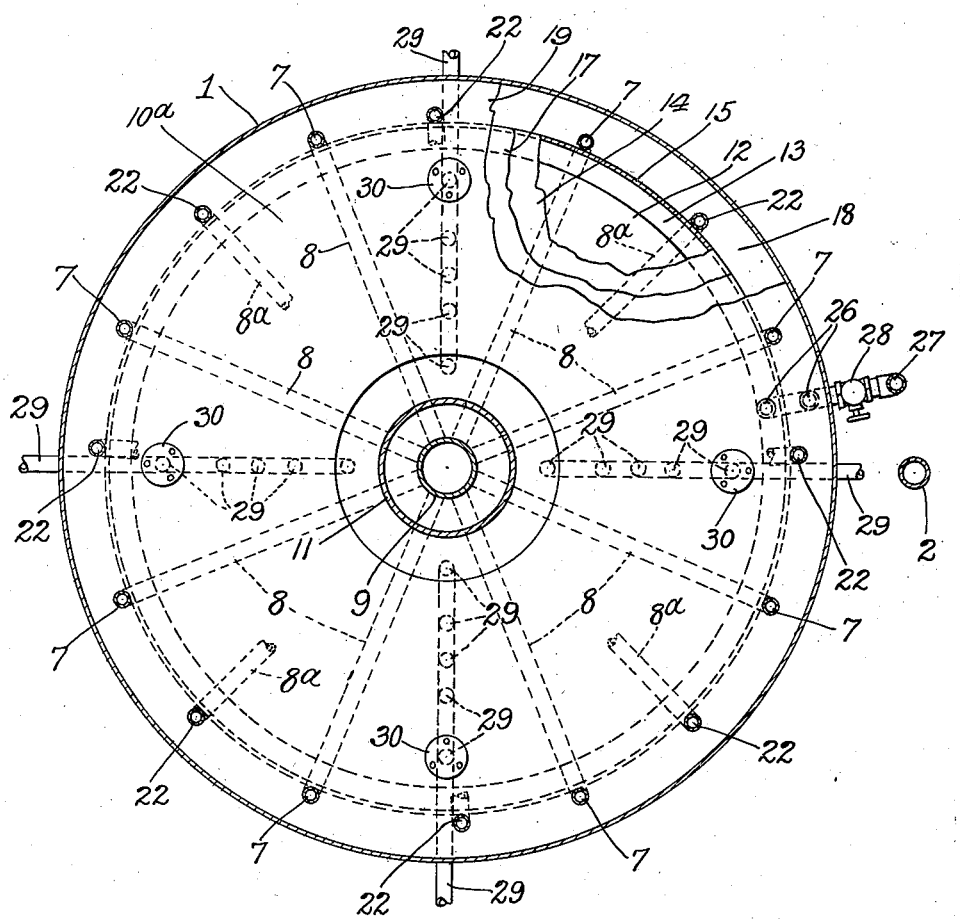
Fig. 2 is a sectional view taken on line 2—2 of Fig. 1.

In the particular construction illustrated, I provide preferably a series of tanks, one above the other, the oil being transferred from one tank to the other. These tanks may be arranged in any desired manner and may be supported by a common support or by separate supports. In the particular construction shown these tanks are formed by providing a main tank 1 and dividing it into a series of sections which act as the floors of the separate tanks. In the particular construction illustrated in Fig. 1, the oil enters through a feed line 2 and passes from this feed line into the bottom of a central pipe 3. The pipe 3 is open at the top and the oil overflows at the upper end, as indicated by the arrows. This oil then drops by gravity to a point near the bottom 4 of the tank 4a, being directed toward the bottom by the direction changing device 5 which is shown as an inverted hollow receptacle. The oil is decelerated in its flow and when it passes out of the bottom of the direction changing device, it spreads out in the tank and the tank is gradually filled.

Near the upper part of the tank I provide a plurality of hollow cone or funnel shaped skimming members 6 which skim off a thin layer of oil at the top. This oil passes by gravity down through the pipes 7, which may be any desired number, which pipes connect with the pipes 8. The pipes 8 deliver the oil to a centrally located pipe 9 which extends up through the bottom 10 of the tank 10a to a point near the top of this tank. The oil then overflows the pipe 9 and is dropped downwardly by gravity and is directed downwardly to a point near the bottom 10 of the tank by the direction changing device 11. Connected with the direction changing device 11 at its lower end, is a horizontally extending direction changing device which consists of a plate or wall 12 which extends to a point near the periphery of the tank, there being a space 13 between the outer edge of the wall 12 and the periphery of the tank. The oil flows between the bottom 10 and the wall 12 outwardly in all directions and is greatly decelerated, that is the speed of its flow is greatly decreased. The oil then passes up around the edge of the wall 12 into the direction changing space between the wall 12 and the direction changing device or wall 14. This wall is connected with the bottom 10 of the tank by a member 15 which extends all the way around so as to direct the oil inwardly. The oil then flows inwardly toward the center of the tank and when it reaches the inner edge of the direction changing device 14, which is separated from the direction changing device 11 by the space 16, its direction is again changed and it moves outwardly between the direction changing device 14 and the direction changing device 17. When the oil reaches the outer edge of the direction changing device 17 it passes up through the space 18, its direction being changed so that it goes toward the center of the tank between the direction changing device 17 and the direction changing device 19. When it reaches the inner edge of the direction changing device 19 it spreads out around the tank and moves upwardly. It will be seen that when the oil moves outwardly from the center toward the periphery of the tank, it moves outwardly in all directions around the cylinder and is therefore greatly decelerated, its movement being greatly slowed up. When its direction is changed and it moves inwardly toward the center of the tank, its movement is accelerated as it is moving from a larger area to a smaller area and the oil is, as it were, squeezed in between the confining members as it approaches the center of the tank. This alternate deceleration and acceleration and change of direction of the oil and squeezing of the oil removes the water, salt, and other solid materials therefrom.

The tank is provided near its top with a series of skimming members 20 which skim off the top of the oil and which transfer it through pipes 22 to pipes 8a which deliver the oil to the bottom of a pipe 9a in the next tank. The skimming devices 20 may be of any desired construction but I prefer to provide them at the center with an upstanding hollow part 21 so that the oil flows into them around this upstanding hollow part and then flows over the top and down through the pipes 22. It will be seen that by means of these skimmers a thin layer of oil is taken from the top of the tank and there is no agitation of the oil, water or salt or other solid matter in the tank as this thin layer at the top is removed. All the skimmers are preferably made adjustable vertically so that the thickness of the layer of oil skimmed off may be adjusted to any desired thickness depending upon the conditions presented. These skimming devices, for example, are preferably arranged to always have their upper edges above the water in the tank so that a layer of oil substantially separate therefrom may be skimmed from the top thereof. By having them adjustable, this can be easily accomplished.

The oil from the tank 10a has a portion of the water, salt and other solid materials removed and it is then transferred by gravity to another tank 10b, which is constructed in the same manner and acts in the same manner as the tank 10a and I have applied to the parts in tank 10b the same reference numerals as are applied to the parts of tank 10a with the exponent a. The oil is skimmed from the tank 10b and then passes to a tank 10c, where it is treated in the same manner. The number of tanks into which the oil is successively delivered will depend upon the conditions presented and the kind of oil treated and there will be a sufficient number of these tanks to properly remove the water, salt and other solid materials.

It will be seen that the oil passes through the tanks by gravity and by the head of the oil. After the oil has been properly cleaned, it passes out through the pipe 25 and is delivered to any desired point.

I also prefer to provide means for removing the water, salt and other solid materials. At least a large portion of this material will be dissolved in the water as the water leaves the oil. The water because it is heavier than the oil, will settle to the bottom of each tank. At the bottom of each tank I provide a discharge pipe 26 which connects with a pipe 27 which carries the water, salt and other solid materials to any desired point. There is preferably a valve 28 in each of the pipes 26 to control the discharge therethrough and when the apparatus is in operation, this valve is preferably slightly open at all times so that the water can be gradually drained from the tanks as it settles in the bottom thereof.

I also prefer to provide some means for introducing water into the tank whenever desired. This water may be used, for example, to wash off any material that may settle on the top of the direction changing device 19, etc. This may be accomplished by providing pipes 29 extending through the direction changing devices 19, etc., and the top direction changing devices 19, 19a, etc., are provided with deflecting devices 30. Water is forced through the pipes 29 and the deflecting devices 30 cause it to spread out and wash any deposits from the direction changing devices 19, etc. This water then settles to the bottom of the tank with its solid matter and the water and at proper intervals the solid matter is drawn out through the pipes 26 and 27. These deflecting devices may be provided for the tops of all the horizontally deflecting members if desired. These pipes 29 and deflectors 30 are shown only in connection with tank 10a but it will be understood that similar means are provided for washing the direction changing plates of each tank.

I claim:

1. An apparatus for cleaning oil comprising a tank, an upstanding pipe in said tank, open at its upper end, means for delivering oil into the lower part of said pipe, a substantially vertically extending direction changing device associated with said pipe for directing the oil downwardly toward the bottom of the tank, a horizontally extending direction changing device connected with said substantially vertically extending direction changing device, which directs the oil in a comparatively thin layer radially toward the outer wall of the tank, there being an open space at the outer edge of said latter direction changing device through which the oil passes.

2. An apparatus for cleaning oil comprising a tank, an upstanding pipe in said tank, open at its upper end, means for delivering oil into the lower part of said pipe, a substantially vertically extending direction changing device associated with said pipe for directing the oil downwardly toward the bottom of the tank, a horizontally extending direction changing device connected with the lower portion of said vertically extending direction changing device, which directs the oil in a comparatively thin layer radially toward the outer wall of the tank, there being an open space at the outer edge of said latter direction changing device through which the oil passes, and another horizontal direction changing device in a higher plane which directs the oil toward the center of the tank after it passes through said space.

3. An apparatus for cleaning oil comprising a tank, an upstanding pipe in said tank, open at its upper end, means for delivering oil into the lower part of said pipe, a direction changing device associated with said pipe for directing the oil downwardly toward the bottom of the tank, a horizontally extending direction changing device connected with the lower portion of said vertically extending direction changing device, which directs the oil in a comparatively thin layer radially toward the outer wall of the tank, there being an open space at the outer edge of said latter direction changing device through which the oil passes, another horizontal direction changing device in a higher plane which directs the oil toward the center of the tank after it passes through said space, and a skimming device for skimming off the top of the body of oil accumulating in the tank.

4. An apparatus for cleaning oil comprising a tank, a vertically extending pipe in said tank into the lower end of which the liquid is inserted, said pipe open at its upper end, a pipe of larger diameter enclosing said first mentioned pipe and closed at its upper end and open at its lower end, through which the liquid passes downwardly on the outside of said first mentioned pipe, a plurality of horizontally extending direction changing devices, the lower one of which is connected with the lower open end of the pipe of larger diameter, said horizontally extending direction changing devices directing the liquid back and forth in comparatively thin layers and discharging it at a higher level than the level at which it enters, and means for directing said liquid to a storage point.

ARNOLD C. LUETGERT.